Aug. 22, 1933.  W. NELSON  1,923,388
NUT LOCK FOR VEHICLE WHEELS
Original Filed June 7, 1928  2 Sheets-Sheet 1

Inventor
William Nelson
By his Attorney
Frank D. Kent

Aug. 22, 1933.    W. NELSON    1,923,388
NUT LOCK FOR VEHICLE WHEELS
Original Filed June 7, 1928    2 Sheets-Sheet 2
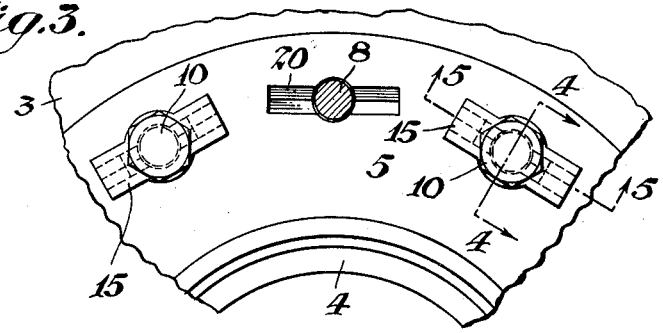
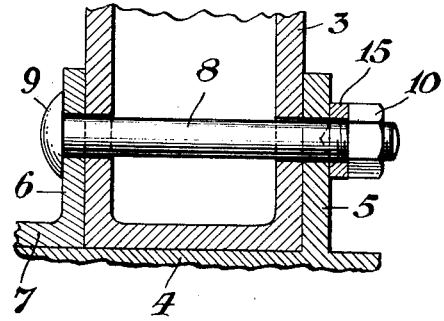
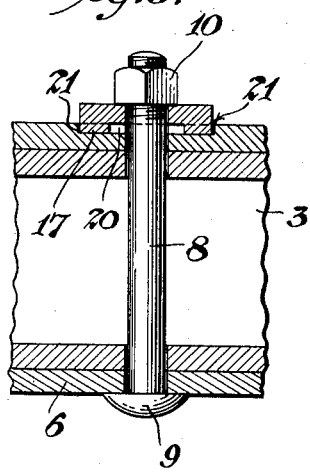
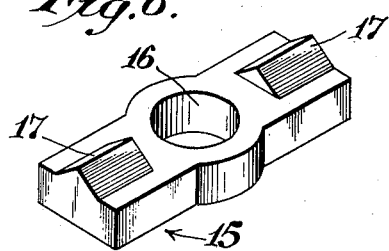
William Nelson Inventor
By his Attorney
Frank D. Kent Patented Aug. 22, 1933

1,923,388

UNITED STATES PATENT OFFICE 1,923,388

NUT LOCK FOR VEHICLE WHEELS

William Nelson, Minneapolis, Minn., assignor to Burnett Walker, New York, N. Y.

Application June 7, 1928, Serial No. 283,520
Renewed May 18, 1932

3 Claims. (Cl. 301—9)

My invention relates to wheels and especially to means for preventing the loosening of bolts used to connect various parts of the wheels, as for example the hub to the spokes or body.

The general object is to increase the security of such connection, and more particularly to greatly reduce or entirely prevent the fastenings from loosening under the repeated and severe torque strains caused by driving and braking forces.

To this end the invention consists, as briefly described, in means associated with the wheel-body, hub and retaining bolts and nuts for preventing slight relative rotary movements of the wheel-body and hub parts from exerting rotative forces upon the fastening devices, or nuts. More particularly stated, such means consists in retainers or blocks located between the nuts and a hub part, and interlocked with the latter, so as to prevent application of the above mentioned rotative forces to the nuts; there is therefore not any, or any appreciable tendency, to cause loosening of the fastening devices, and the wheel-body remains securely and tightly clamped to the hub for an indefinite period of service.

The characteristics and advantages of the invention are further sufficiently explained in connection with the following detailed description of the accompanying drawings, which show one preferred embodiment. After considering this example, skilled persons will understand that many variations may be made, and I contemplate the employment of any structures that are properly within the scope of the appended claims.

Fig. 3 is a partial elevation, enlarged, with some parts removed or in section.

Fig. 4 is an enlarged section at 4—4, Fig. 3.

Fig. 5 is a section at 5—5, Fig. 3.

Fig. 6 is a perspective view of one of the retainers.

Figure 1:
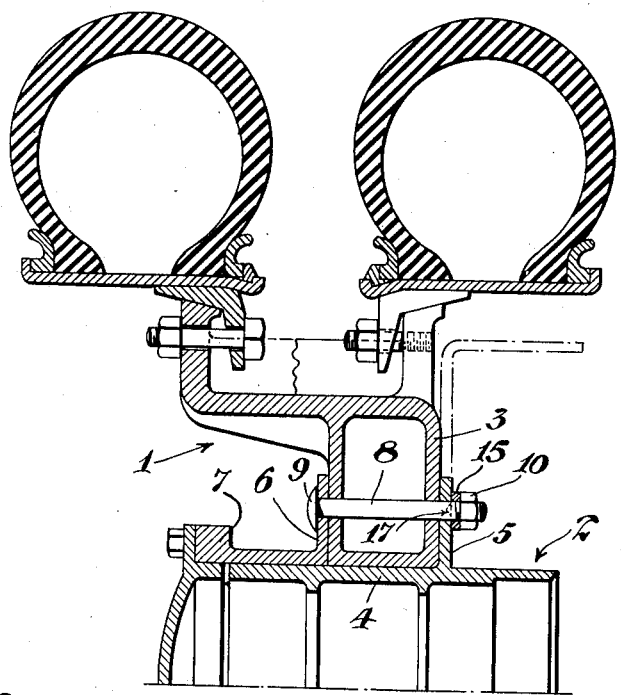
Fig. 1 is a section, in an axial plane, of one-half of a wheel structure, embodying the invention in one form.
Figure 2:
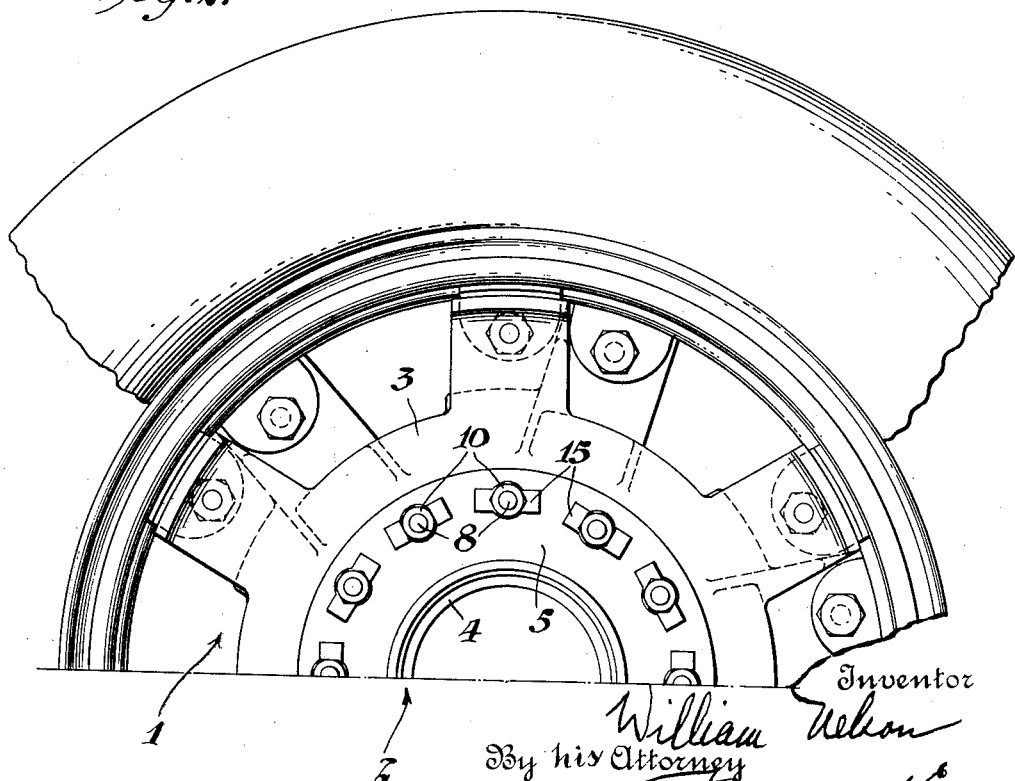
Fig. 2 is a right-side elevation.

The drawings show a wheel body 1 and a hub 2 of representative forms, which may vary almost indefinitely, as the invention relates more particularly to the fastening means. In the present instance the body 1 is of metal including a central portion 3 of hollow annular or box form. The central bore of this body portion has a close or slide fit on the main hub sleeve 4, and is located between a flange 5, which is integral with the main hub, and another flange 6, carried by a sleeve 7 fitting over the hub, all of which may be as usual. In ordinary practice, the stated parts are detachably secured together by bolts 8 having heads 9, passing through aligned apertures in the wheel-body and flanges, and nuts 10 upon the threaded ends of the bolts, bearing against one of the hub flanges, as 5, with or without interposed plain or "lock" washers (not shown).

Because of the technical impossibility of making such separate and interfitted parts with microscopically-tight "fits", in service there are repeated slight relative rotary movements of the hub and wheel-body, caused by braking and driving forces. Thus, the hub has slight play or clearance in the bore of the wheel body, and the bolts have substantial clearance in their holes, so that no matter how tightly the nuts are set up, the torque strains cause slight arcuate sliding of the nuts or their washers in relation to flange 5; and because of the greater arc of motion at the outside of the bolt center as compared with the inside, in time the nuts are more or less turned and the whole fastening structure becomes loose, noisy and insecure, requiring an undesirable amount of "service" attention. This difficulty cannot be remedied by any heretofore known means, such as providing screw threads of particular or different "leads" (right or left hand), because the driving and braking forces tend to move the wheel and hub parts in opposite relative directions, and any thread-lead arrangement which would resist loosening in one direction will not resist, or may even amplify, the loosening tendency in the other direction of relative movement of the parts.

To overcome this defect or disadvantage, I provide solid retainers, or blocks 15 (one of which is shown sparately in Fig. 6), located between nuts 10 and the adjacent hub-flange 5. These blocks may be substantially oblong, as shown, and each includes a central aperture 16 to receive the bolt, and on its inwardly-located face, at each side of the opening, a tooth or spline 17, which is desirably of wedge form. To cooperate with these tooth formations, flange 5 has in its outer face, intersecting each bolt-hole, a socket or channel 20, of cross section complemental to that of teeth 17. The channels 20 are desirably, as indicated in Fig. 5, slightly longer than blocks 15, or especially the overall tooth length thereof, providing a slight clearance 21 at each outer tooth-end, thus permitting the blocks to slide slightly longitudinally (or circularly, with relation to the wheel structure) under stress of the alternating driving and braking forces. The degree of movement of the blocks is so slight that it is usually unnecessary to arcuately curve the block tooth or flange socket formations.

When the blocks or inflexible retainers are positioned as shown and as above described, and the nuts set up tight, the blocks are in effect positively connected to the bolts and nuts, and torque-forces which move flange 5 rotatively in relation to the bolts, cause this motion to be taken up in a sliding of the blocks 15, in the direction of their length, in relation to the flange-face; there is therefore no relative movement between the outer block-faces and the nuts; the blocks are moreover prevented from rotating about the bolts by engagement of their teeth 17 in the flange channels or sockets 20; hence there is no rotative force applied to the nuts, which remain tight, and secure the hub and wheel body together without preceptible relative movement or looseness, for an indefinite time.

The drawings show the wheel body arranged for support of two tires on demountable rims, but the invention is evidently not limited as to the number of tires, or in general, as to other features of the wheel and hub, and it may be applied wherever nuts are subjected to the loosening action herein referred to.

The term "solid retainers" used in the specification and claims is intended to refer to a form of retainer construction which exerts no appreciable degree of compression or expansive force when clamped in position.

I claim:

1. In a vehicle wheel construction, the combination of a hub member, a felly member mounted on said hub member and tending to have rotative movement relative to said hub member, bolts passing through a portion of said hub member and a portion of said felly member, retainer blocks carried by said bolts, means to cause said retainer blocks to tend to move tangentially to the said rotative movement between said hub member and said felly member whereby said bolts are clamped when said members tend to move, and nuts on said bolts to secure said blocks solidly in place.

2. In a vehicle wheel structure comprising a hub and a separate wheel body surrounding the hub and having a felly member, a bolt passing through a portion of the hub and a portion of the felly member and disposed substantially parallel to the wheel axis, a nut on the bolt, and a solid retainer block apertured to accommodate the bolt and located between the nut and the adjacent hub part, said hub part and retainer block having interlocking formations preventing rotation of the retainer block under torque acting on the wheel structure, said interlocking formations being arranged to permit limited straight line movement of the block in directions transverse to a radius extending from the wheel axis through the bolt and in a plane parallel to said radius.

3. In a vehicle wheel structure comprising a hub and a separate wheel body surrounding the hub and having a felly member, a bolt passing through a portion of the hub member and a portion of the felly member and substantially parallel to the wheel axis, a nut on the bolt, and means operative upon relative movement between hub and felly member, to translate the resulting force acting on the bolt into a limited straight line movement of the bolt in a direction transverse to a radius extending from the wheel axis through the bolt and in a plane parallel to said radius.

WILLIAM NELSON.